United States Patent
Kuo et al.

(10) Patent No.: US 10,382,878 B2
(45) Date of Patent: Aug. 13, 2019

(54) SOUND REPRODUCING METHOD, APPARATUS AND NON-TRANSITORY COMPUTER READABLE STORAGE MEDIUM THEREOF

(71) Applicant: HTC Corporation, Taoyuan (TW)

(72) Inventors: Yan-Min Kuo, Taoyuan (TW); Chun-Min Liao, Taoyuan (TW); Li-Yen Lin, Taoyuan (TW); Chi-Tang Ho, Taoyuan (TW); Tien-Ming Wang, Taoyuan (TW); Tsung-Yu Tsai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/162,419

(22) Filed: Oct. 17, 2018

(65) Prior Publication Data

US 2019/0116446 A1    Apr. 18, 2019

Related U.S. Application Data

(60) Provisional application No. 62/574,156, filed on Oct. 18, 2017.

(51) Int. Cl.
*H04S 7/00*        (2006.01)
*G06F 17/11*       (2006.01)
*H04S 3/00*        (2006.01)

(52) U.S. Cl.
CPC .............. *H04S 7/303* (2013.01); *G06F 17/11* (2013.01); *H04S 3/002* (2013.01); *H04S 2400/11* (2013.01)

(58) Field of Classification Search
CPC ...... H04S 7/303; H04S 3/002; H04S 2400/11; G06F 17/11
See application file for complete search history.

(56) References Cited

U.S. PATENT DOCUMENTS

| | | | | |
|---|---|---|---|---|
| 7,489,788 B2* | 2/2009 | Leung | .................... | H04R 5/027 381/92 |
| 2007/0025562 A1* | 2/2007 | Zalewski | ............... | H04R 3/005 381/92 |
| 2007/0274528 A1* | 11/2007 | Nakamoto | ................ | H04S 7/30 381/17 |

\* cited by examiner

*Primary Examiner* — Andrew L Sniezek
(74) *Attorney, Agent, or Firm* — CKC & Partners Co., LLC

(57) ABSTRACT

A sound reproducing method used in sound reproducing apparatus that includes the steps outlined below is provided. A sound signal with a three-dimensional (3D) sound generating process is generated according to listener data and sound data. Whether a sound source position is within a target region relative to a listener position within a virtual environment is determined according to the listener data and the sound data. The sound signal is multiplied by an adjusting function to enhance peaks and valleys of the sound signal while maintaining a behavior of the sound signal when the sound source position is within the target region. The sound signal is reproduced.

18 Claims, 4 Drawing Sheets

SOUND REPRODUCING METHOD, APPARATUS AND NON-TRANSITORY COMPUTER READABLE STORAGE MEDIUM THEREOF

RELATED APPLICATIONS

This application claims priority to U.S. Provisional Application Ser. No. 62/574,156, filed Oct. 18, 2017, which is herein incorporated by reference.

BACKGROUND

Field of Disclosure

The present disclosure relates to sound reproducing technology. More particularly, the present disclosure relates to a sound reproducing method, a sound reproducing apparatus and a non-transitory computer readable storage medium thereof.

Description of Related Art

In recent years, virtual reality technology is widely used in the fields such as gaming, engineering and military, etc. In order to experience the virtual reality environment, a user needs to view the displayed frames displaying a virtual environment through the display apparatus disposed at such as, but not limited a head-mounted device (HMD) wear by the user. Further, the user can listen to the sound generated based on the virtual environment by using a sound reproducing apparatus disposed also at the HMD.

A better virtual reality experience can be obtained when the sense of direction of the sound can be enhanced. The conventional three dimensional sound models are not able to provide enough sense of direction close to the real environment. However, if a model close to the real environment is used, a large amount of computation resource is required.

Accordingly, what is needed is a sound reproducing method, a sound reproducing apparatus and a non-transitory computer readable storage medium thereof to address the above issues.

SUMMARY

An aspect of the present disclosure is to provide a sound reproducing method used in sound reproducing apparatus that includes the steps outlined below. A sound signal with a three-dimensional (3D) sound generating process is generated according to listener data and sound data. Whether a sound source position is within a target region relative to a listener position within a virtual environment is determined according to the listener data and the sound data. The sound signal is multiplied by an adjusting function to enhance peaks and valleys of a frequency spectrum of the sound signal while maintaining a behavior of the sound signal when the sound source position is within the target region. The sound signal is reproduced.

Another aspect of the present disclosure is to provide a sound reproducing apparatus that includes a storage, a sound playback circuit and a processor. The storage is configured to store a plurality of computer-executable instructions. The processor is electrically coupled to the storage and the sound playback circuit and configured to retrieve and execute the computer-executable instructions to perform a sound reproducing method when the computer-executable instructions are executed, wherein the sound reproducing method includes the steps outlined below. A sound signal with a three-dimensional (3D) sound generating process is generated according to listener data and sound data. Whether a sound source position is within a target region relative to a listener position within a virtual environment is determined according to the listener data and the sound data. The sound signal is multiplied by an adjusting function to enhance peaks and valleys of a frequency spectrum of the sound signal while maintaining a behavior of the sound signal when the sound source position is within the target region. The sound signal is reproduced by the sound playback circuit.

Yet another aspect of the present disclosure is to provide a non-transitory computer readable storage medium that that stores a computer program including a plurality of computer-executable instructions to perform a sound reproducing method used in a sound reproducing apparatus, the sound reproducing apparatus at least includes a storage, a sound playback circuit and a processor electrically coupled to the storage and the sound playback circuit and configured to retrieve and execute the computer-executable instructions to perform the sound reproducing method when the computer-executable instructions are executed. The sound reproducing method includes the steps outlined below. A sound signal with a three-dimensional (3D) sound generating process is generated according to listener data and sound data. Whether a sound source position is within a target region relative to a listener position within a virtual environment is determined according to the listener data and the sound data. The sound signal is multiplied by an adjusting function to enhance peaks and valleys of a frequency spectrum of the sound signal while maintaining a behavior of the sound signal when the sound source position is within the target region. The sound signal is reproduced by the sound playback circuit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
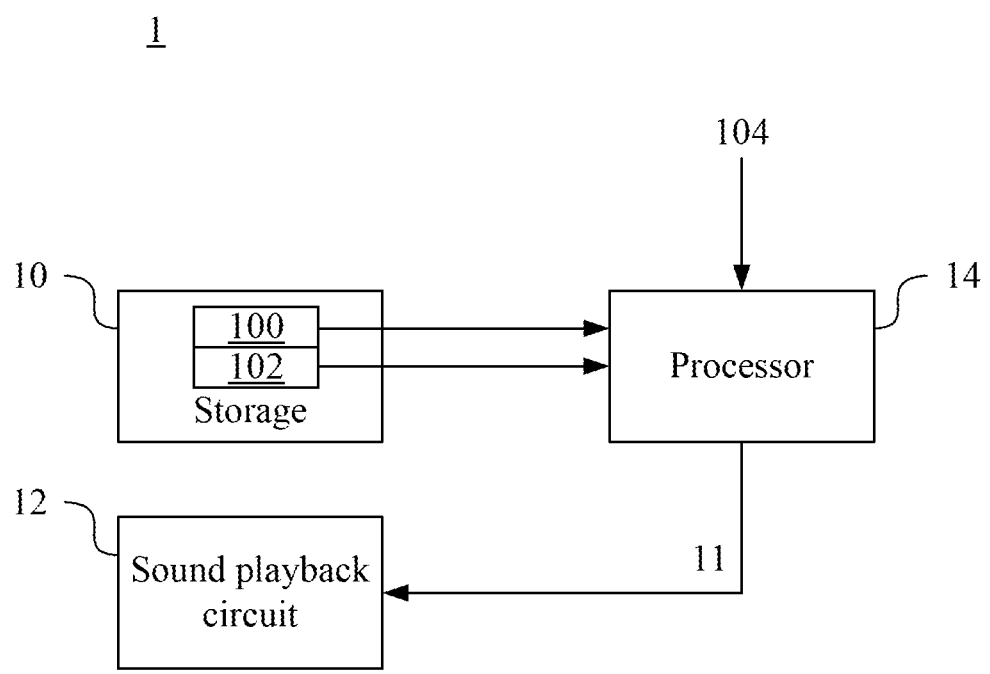
FIG. 1 is a block diagram of a sound reproducing apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a block diagram of a sound reproducing apparatus 1 in an embodiment of the present invention. In an embodiment, the sound reproducing apparatus 1 is used in a head-mounted device (HMD). More specifically, the components of the sound reproducing apparatus 1 are disposed at various positions of the HMD.

The sound reproducing apparatus 1 includes a storage 10, a sound playback circuit 12 and a processor 14.

In an embodiment, the storage 10 can be such as, but not limited to CD ROM, RAM, ROM, floppy disk, hard disk or optic magnetic disk. The storage 10 is configured to store a plurality of computer-executable instructions 100.

The sound playback circuit 12 is configured to reproduce a sound signal 11 generated by the processor 14. In an embodiment, the sound playback circuit 12 may include a first playback unit and a second playback unit (not illustrated) configured to playback a first channel sound and a second channel sound, in which a user that wears the HMD can put the first playback unit and the second playback unit into or close to the two ears of the user to hear the playback result.

The processor 14 is electrically coupled to the storage unit 10 and the sound playback circuit 12. In an embodiment, the processor 14 is configured to retrieve and execute the computer-executable instructions 100 to operate the function of the sound reproducing apparatus 1 accordingly.

Figure 2:
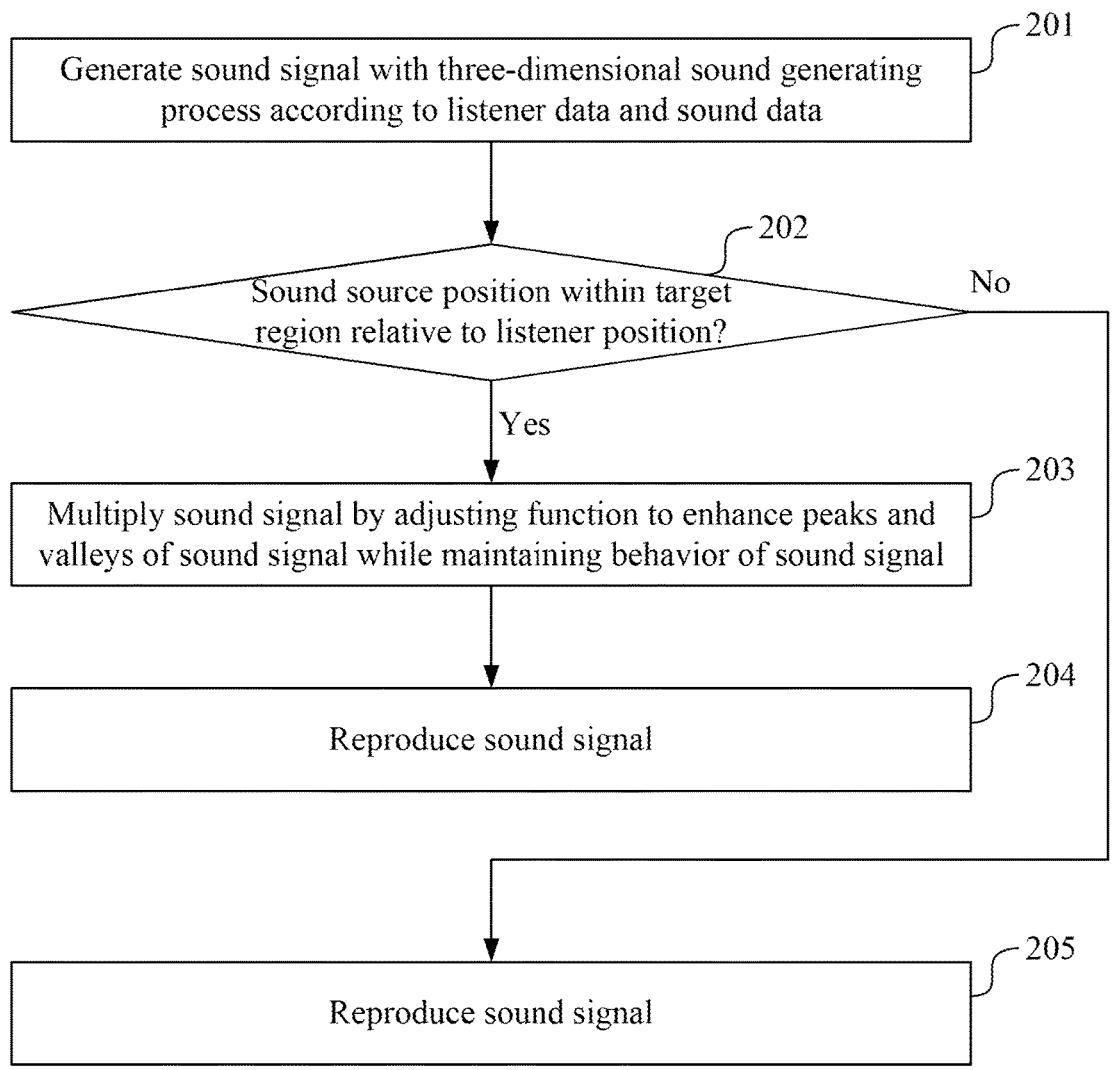
FIG. 2 is a flow chart of a sound reproducing method in an embodiment of the present invention.

Reference is now made to FIG. 2. The detail of the function of the sound reproducing apparatus 1 is described in the following paragraphs in accompany with FIG. 1 and FIG. 2.

FIG. 2 is a flow chart of a sound reproducing method 200 in an embodiment of the present invention. The sound reproducing method 200 can be used in the sound reproducing apparatus 1 illustrated in FIG. 1.

The sound reproducing 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, a sound signal 11 is generated with a three-dimensional (3D) sound generating process according to listener data 102 and sound data 104.

Figure 3:
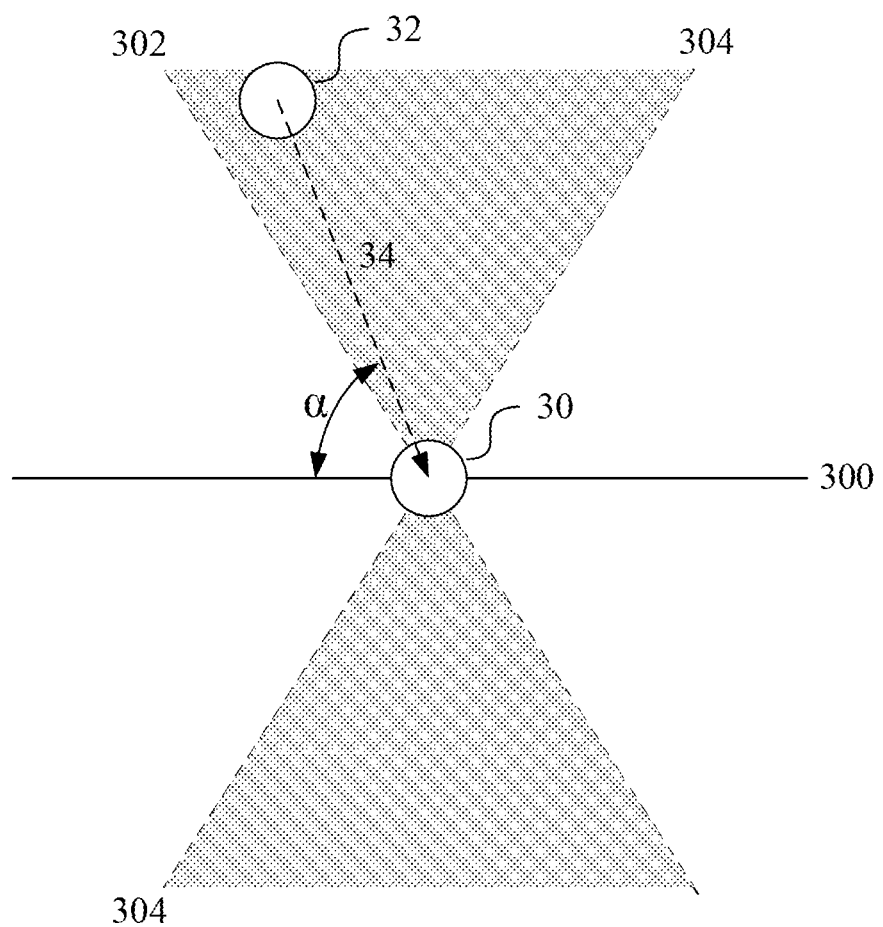
FIG. 3 is a diagram illustrating a listener and a sound source within a virtual environment in an embodiment of the present invention.

Reference is now made to FIG. 3 at the same time. FIG. 3 is a diagram illustrating a listener 30 and a sound source 32 within a virtual environment 3 in an embodiment of the present invention.

In an embodiment, the listener data 102 includes information of a position of the listener 30, i.e. the user of the HMD, in the virtual environment 3. The listener data 102 is stored in the storage 10 and can be updated in a real time manner depending on a process of a simulated scenario such as, but not limited to game or military training. The processor 14 is able to retrieve the listener data 102 from the storage 10.

In an embodiment, the sound data 104 includes information of a position of the sound source 32 that generates a sound 34 in the virtual environment 3 perceived by the user. The sound data 104 can be received through such as, but not limited to a network module (not illustrated) in the sound reproducing apparatus 1 by the processor 14 and can be generated during the process of the simulated scenario.

Based on the listener data 102 and the sound data 104, the processor 14 can obtain the positions of the listener 30 and the sound source 32.

A transmission path of the sound 34 is formed between the sound source 32 and the listener 30. As a result, the sound signal 11 is generated with the three-dimensional sound generating process such that the reproducing of the sound signal 11 results in the sound 34 that is directional and corresponding to the transmission path.

In step 202, whether a sound source position is within a target region relative to a listener position within a virtual environment is determined according to listener data 102 and sound data 104.

In an embodiment, based on the sound source position of the sound source 32 and the listener position of the listener 30 within the virtual environment 3, the relation of the positions of the listener 30 and the sound source 32 can be determined.

As illustrated in FIG. 3, a central plane 300 is extended from the listener position of the listener 30. In an embodiment, the central plane 300 is located at a head of the listener 30 and is substantially in parallel to a visual axis of the listener 30. However, the present invention is not limited thereto.

The transmission path forms an angle α relative to the central plane 300. In FIG. 3, axes 302 and 304 each having an angle with a predetermined value are exemplarily illustrated. In an embodiment, when the angle α is not smaller than the predetermined value, e.g. 60 degrees, the sound source position is determined to be within the target region relative to the listener position, in which the target region is illustrated as a shaded region in FIG. 3.

It is appreciated that FIG. 3 is a cross-sectional view. As a result, in the three dimensional virtual environment 3, the target region actually includes two cones that locate at two sides of the central plane 300 respectively.

On the other hand, when the angle α is smaller than the predetermined value, the sound source position is determined to be not within the target region relative to the listener position.

When the sound source position is determined to be within the target region as illustrated in FIG. 3, in step 203, the sound signal 11 is multiplied by an adjusting function to enhance peaks and valleys of a frequency spectrum of the sound signal 11 while maintaining a behavior of the sound signal 11.

In an embodiment, the amplitude of the sound signal is X and the adjusting function is an exponential function that is $X^N$ or $e^x$, wherein N is an integer larger than 1 and e is a base of the natural logarithm.

In another embodiment, the adjusting function is a trigonometric function that is $\tan^{-1}X$.

Figure 4:
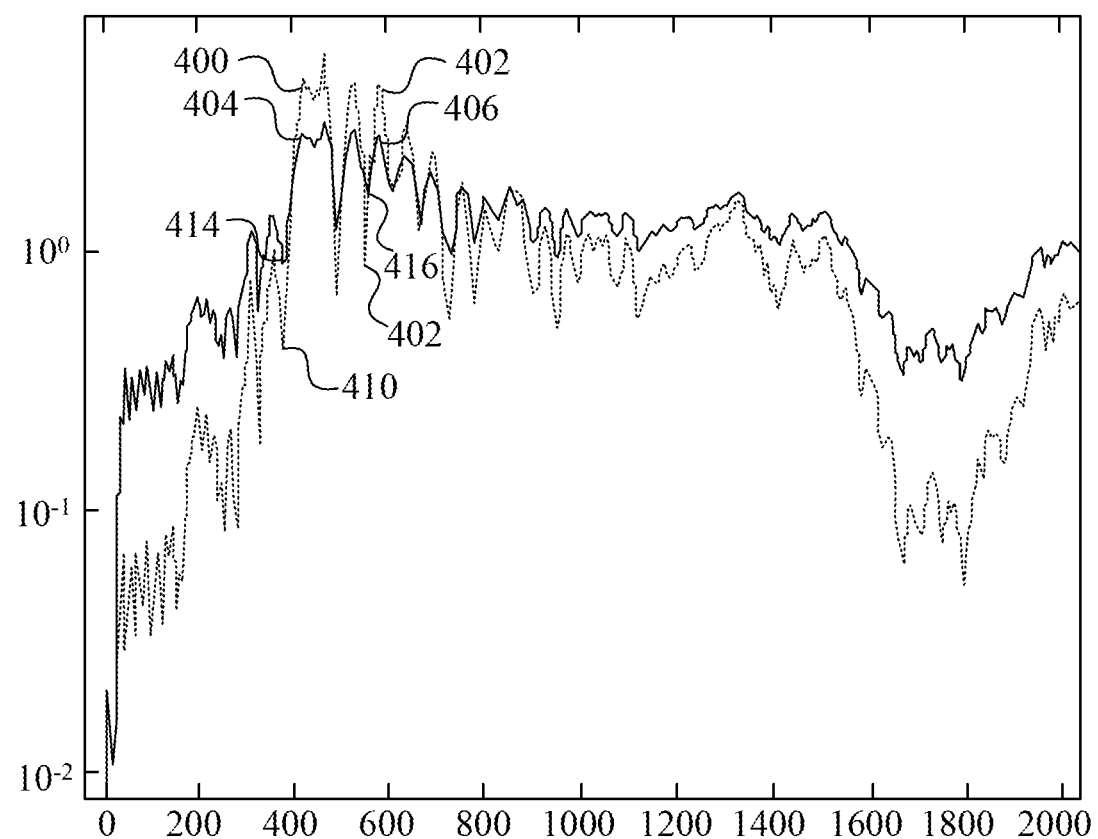
FIG. 4 is a diagram illustrating the frequency spectrum of the sound signal before and after being multiplied by the adjusting function in an embodiment of the present invention.

Reference is now made to FIG. 4. FIG. 4 is a diagram illustrating a frequency spectrum of the sound signal 11 before and after being multiplied by the adjusting function in an embodiment of the present invention. The X-axis in FIG. 4 stands for the frequencies, and the Y-axis in FIG. 4 stands for the amplitude of the frequencies.

In FIG. 4, $X^N$ is used as the example of the adjusting function, in which the waveform of the sound signal 11 before being multiplied by the adjusting function is illustrated by a dashed line, and the waveform of the sound signal 11 after being multiplied by the adjusting function is illustrated by a solid line.

As shown in FIG. 4, the difference between the peaks (e.g. the peaks 400 and 402) and the valleys (e.g. the valleys 410 and 412) of the sound signal 11 after being multiplied by the adjusting function are higher than the difference between the corresponding peaks (e.g. the peaks 404 and 406) and the corresponding valleys (e.g. the valleys 414 and 416) of the sound signal 11 before being multiplied by the adjusting function. However, the positions of the peaks and the valleys of the sound signal 11 after being multiplied by the adjusting function still correspond to the positions of the peaks and the valleys of the sound signal 11 before being multiplied by the adjusting function.

As a result, the peaks and valleys of the sound signal 11 are enhanced while a behavior of the sound signal 11 is maintained.

When the position of the sound source is at an upper side or at a lower side of the position of the listener, the listener perceives the sound based on the peaks and the valleys of the sound. Consequently, by enhancing the peaks and the valleys of the sound signal 11, the listener can have a stronger sense of the direction of the sound signal 11.

In an embodiment, after the sound signal 11 is multiplied by the adjusting function, the overall amplitude of the sound signal 11 may become smaller. Under such a condition, the sound signal 11 can be further multiplied by a gain parameter to increase the amplitude to an acceptable level.

Further, in step 204, the sound signal 11 is reproduced by the sound playback circuit 12.

On the other hand, when the sound source position is not within the target region, in step 205, the sound signal 11 is directly reproduced by the sound playback circuit 12. It appreciated that the term "directly" means that the sound signal 11 is not processed by step 203 described above and may be processed by other sound processing procedures.

In an embodiment, during the processing of the sound signal 11, a plurality of adjusting parameters can be determined to increase differences between a front component and a rear component and between a left component and a right component of the sound signal 11. Such a procedure can enhance the stereo effect of the sound signal 11.

In an embodiment, a weighting value can be determined according to the angle α of the sound source position relative to the central plane 300. When the angle α is larger, the weighting value is smaller. On the other hand, when the angle α is smaller, the weighting value is larger. The relation of the weighting value and the angle α can be implemented as a look-up table (not illustrated) stored in the storage 10 such that the processor 14 can retrieve the look-up table and obtain the weighting value according to the angle α. Further, the adjusting parameters can be weighted according to the weighting value and the weighted adjusting parameters can be applied to the sound signal 11.

As a result, the stereo effect of the sound signal 11 can thus be enhanced based on the relation between the sound source position and the listener position.

The sound reproducing apparatus 1 and the sound reproducing method 200 of the present invention can enhance the sound signal 11 based on the relation of the positions of the listener and the sound source without consuming lots of computational resources. By enhancing the peaks and the valleys of the sound signal 11, the listener can have a stronger sense of the direction of the sound signal 11.

It should be noted that, in some embodiments, the sound reproducing method 200 may be implemented as a computer program. When the computer program is executed by a computer, an electronic device, or the processor 14 in FIG. 1, this executing device performs the sound reproducing method 200. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sound reproducing method used in sound reproducing apparatus comprising:
    generating a sound signal with a three-dimensional (3D) sound generating process according to listener data and sound data;
    determining whether a sound source position is within a target region relative to a listener position within a virtual environment according to the listener data and sound data;
    multiplying the sound signal by an adjusting function to enhance peaks and valleys of a frequency spectrum of the sound signal while maintaining a behavior of the sound signal when the sound source position is within the target region; and
    reproducing the sound signal.

2. The sound reproducing method of claim 1, wherein the amplitude of the sound signal is X and the adjusting function is an exponential function that is $X_N$ or $e^x$, wherein N is an integer larger than 1 and e is a base of the natural logarithm.

3. The sound reproducing method of claim 1, wherein the amplitude of the sound signal is X and the adjusting function is a trigonometric function that is $\tan^{-1}X$.

4. The sound reproducing method of claim 1, wherein when an angle of the sound source position relative to a central plane extended from the listener position is not smaller than a predetermined value, the sound source position is determined to be within the target region relative to the listener position.

5. The sound reproducing method of claim 4, further comprising:
    determining a plurality of adjusting parameters to increase differences between a front component and a rear component and between a left component and a right component of the sound signal;
    determining a weighting value according to the an angle of the sound source position relative to the central plane, wherein the weighting value is smaller when the angle is larger; and
    weighting the adjusting parameters according to the weighting value and applying the weighted adjusting parameters to the sound signal.

6. The sound reproducing method of claim 1, wherein after the step of multiplying the sound signal by the adjusting function, the sound reproducing method further comprises:
    multiplying the sound signal by a gain parameter.

7. A sound reproducing apparatus comprising:
    a storage configured to store a plurality of computer-executable instructions;
    a sound playback circuit; and
    a processor electrically coupled to the storage and the sound playback circuit and configured to retrieve and execute the computer-executable instructions to perform a sound reproducing method when the computer-executable instructions are executed, wherein the sound reproducing method comprises:
        generating a sound signal with a three-dimensional sound generating process according to listener data and sound data;
        determining whether a sound source position is within a target region relative to a listener position within a virtual environment according to the listener data and sound data;
        multiplying the sound signal by an adjusting function to enhance peaks and valleys of a frequency spectrum of the sound signal while maintaining a behavior of the sound signal when the sound source position is within the target region; and
        reproducing the sound signal by the sound playback circuit.

8. The sound reproducing apparatus of claim 7, wherein the amplitude of the sound signal is X and the adjusting function is an exponential function that is $X^N$ or $e^x$, wherein N is an integer larger than 1 and e is a base of the natural logarithm.

9. The sound reproducing apparatus of claim 7, wherein the amplitude of the sound signal is X and the adjusting function is a trigonometric function that is $\tan^{-1}X$.

10. The sound reproducing apparatus of claim 7, wherein when an angle of the sound source position relative to a central plane extended from the listener position is not smaller than a predetermined value, the sound source position is determined to be within the target region relative to the listener position.

11. The sound reproducing apparatus of claim 10, wherein the sound reproducing method further comprises:
    determining a plurality of adjusting parameters to increase differences between a front component and a rear component and between a left component and a right component of the sound signal;
    determining a weighting value according to the an angle of the sound source position relative to the central plane, wherein the weighting value is smaller when the angle is larger; and
    weighting the adjusting parameters according to the weighting value and applying the weighted adjusting parameters to the sound signal.

12. The sound reproducing apparatus of claim 7, wherein after the step of multiplying the sound signal by the adjusting function, the sound reproducing method further comprises:
    multiplying the sound signal by a gain parameter.

13. A non-transitory computer readable storage medium that stores a computer program comprising a plurality of computer-executable instructions to perform a sound reproducing method used in a sound reproducing apparatus, the sound reproducing apparatus at least comprises a storage, a sound playback circuit and a processor electrically coupled to the storage and the sound playback circuit and configured to retrieve and execute the computer-executable instructions to perform the sound reproducing method when the computer-executable instructions are executed, wherein the sound reproducing method comprises:
    generating a sound signal with a three-dimensional (3D) sound generating process according to listener data and sound data;
    determining whether a sound source position is within a target region relative to a listener position within a virtual environment according to the listener data and sound data;
    multiplying the sound signal by an adjusting function to enhance peaks and valleys of a frequency spectrum of the sound signal while maintaining a behavior of the sound signal when the sound source position is within the target region; and
    reproducing the sound signal by the sound playback circuit.

14. The non-transitory computer readable storage medium of claim 13, wherein the amplitude of the sound signal is X and the adjusting function is an exponential function that is $X^N$ or $e^x$, wherein N is an integer larger than 1 and e is a base of the natural logarithm.

15. The non-transitory computer readable storage medium of claim 13, wherein the amplitude of the sound signal is X and the adjusting function is a trigonometric function that is $\tan^{-1} X$.

16. The non-transitory computer readable storage medium of claim 13, wherein when an angle of the sound source position relative to a central plane extended from the listener position is not smaller than a predetermined value, the sound source position is determined to be within the target region relative to the listener position.

17. The non-transitory computer readable storage medium of claim 16, wherein the sound reproducing method further comprises:
   determining a plurality of adjusting parameters to increase differences between a front component and a rear component and between a left component and a right component of the sound signal;
   determining a weighting value according to the an angle of the sound source position relative to the central plane, wherein the weighting value is smaller when the angle is larger; and
   weighting the adjusting parameters according to the weighting value and applying the weighted adjusting parameters to the sound signal.

18. The non-transitory computer readable storage medium of claim 13, wherein after the step of multiplying the sound signal by the adjusting function, the sound reproducing method further comprises:
   multiplying the sound signal by a gain parameter.

* * * * *